(12) United States Patent
Houze et al.

(10) Patent No.: US 7,881,248 B2
(45) Date of Patent: Feb. 1, 2011

(54) ALLOCATION OF FREQUENCY BANDS TO RADIO COMMUNICATION SYSTEMS

(75) Inventors: Paul Houze, Ivry sur Seine (FR); Sana Ben Jemaa, Issy les Moulineaux (FR)

(73) Assignee: France Telecom, Paris (FR)

( * ) Notice: Subject to any disclaimer, the term of this patent is extended or adjusted under 35 U.S.C. 154(b) by 650 days.

(21) Appl. No.: 11/935,449

(22) Filed: Nov. 6, 2007

(65) Prior Publication Data
US 2008/0107097 A1 May 8, 2008

(30) Foreign Application Priority Data
Nov. 7, 2006 (FR) .................................. 06 54766

(51) Int. Cl.
*H04B 7/204* (2006.01)
(52) U.S. Cl. ........................................ 370/319; 370/344
(58) Field of Classification Search ................. 370/330, 370/436, 478, 395.41
See application file for complete search history.

(56) References Cited

U.S. PATENT DOCUMENTS

| | | | | |
|---|---|---|---|---|
| 6,018,528 A | * | 1/2000 | Gitlin et al. .................. | 370/436 |
| 2005/0282550 A1 | * | 12/2005 | Cho et al. .................... | 455/447 |
| 2009/0196180 A1 | * | 8/2009 | Bahl et al. .................. | 370/235 |

FOREIGN PATENT DOCUMENTS

| | | |
|---|---|---|
| EP | 0847213 | 6/1998 |
| EP | 0928121 | 7/1999 |
| WO | 94/28650 | 12/1994 |
| WO | 2005/104602 | 11/2005 |

OTHER PUBLICATIONS

Sanchez, Stephane et al., Resolution D'un Probleme D'Amenagement Spatial A L'aide D'un Algorithme Genetique, Irit, Laboratoire de Recherche en Informatique de Toulouse.

* cited by examiner

*Primary Examiner*—Brenda Pham
(74) *Attorney, Agent, or Firm*—Lowe Hauptman Ham & Berner LLP

(57) ABSTRACT

To allocate frequency bands to respective radio communication systems, allocation of a frequency band to each radio communication system is modeled by at least one three-dimensional block as a function of a frequency bandwidth and a coverage area of the radio communication system so as to determine at least one block distribution of the modeled blocks. A score is assigned to each block distribution as a function of a minimum frequency band including all the frequency bands of the blocks of the block distribution. Frequency bands are allocated to the radio communication systems in accordance with an adopted block distribution having a score more than a predetermined threshold. The assigned score can be depend on a number of collisions between blocks of said each block distribution and protection bubbles around modeled blocks. The radio communication systems in the protection bubbles do not suffer mutual interference above respective tolerance thresholds.

9 Claims, 3 Drawing Sheets

ALLOCATION OF FREQUENCY BANDS TO RADIO COMMUNICATION SYSTEMS

RELATED APPLICATIONS

The present application is based on, and claims priority from, French Application Number 0654766, filed Nov. 7, 2006, the disclosure of which is hereby incorporated by reference herein in its entirety.

BACKGROUND OF THE INVENTION

1. Field of the Invention

The present invention relates to allocation of frequency bands to radio communication systems, such as cellular radio communication networks, wireless local area networks or broadcast networks (for example radio broadcasting of television signals).

2. Description of the Prior Art

Frequency bands are generally allocated to radio communication systems in a fixed manner, in order to limit interference between different radio communication systems.

Frequency bands can also be allocated to radio communication systems dynamically, as a function of space and/or time. For example, frequency band allocation is adapted dynamically to the changing spectrum requirements of a radio communication system covering a conurbation that requires a broader frequency band at the end of the week than at the start of the week.

Some radio communication systems can use frequencies varying in one or more frequency bands, in order not to cause interference within the same radio communication system or to other radio communication systems sharing one or more common frequency bands. However, it is difficult to predict interference between any two radio communication systems whose spectrum requirements can vary.

In the state of the art there is no general method for allocating frequency bands statically or dynamically to any number of radio communication systems in order to guarantee minimum interference between the radio communication systems.

SUMMARY OF THE INVENTION

To remedy these drawbacks, a method according to the invention for allocating frequency bands to respective radio communication systems comprises:

modeling allocation of a frequency band to each radio communication system by at least one three-dimensional block as a function of a frequency bandwidth and a coverage area of the radio communication system, determining at least one block distribution of the modeled blocks, assigning a first score to each block distribution as a function of a minimum frequency band including all the frequency bands of the blocks of the block distribution, and adopting a block distribution having a first score more than a predetermined threshold in order to allocate frequency bands to the radio communication systems in accordance with the block distribution adopted.

Throughout the application, the expression coverage area means an area in which a given service associated with a radio communication system is accessible.

The invention takes into account any number of radio communication systems of any type when modeling frequency band allocations using three-dimensional blocks.

The frequency bands are allocated in accordance with the invention to the radio communication systems in such a manner as to respect the total frequency band available for the radio communication systems, and in particular to minimize the total frequency band allocated to the radio communication system.

According to another feature of the invention, the method can further comprise constructing protection bubbles around modeled blocks of each block distribution, the radio communication systems in the protection bubbles not suffering mutual interference above respective tolerance thresholds, and the first score being assigned to each block distribution also as a function of a number of collisions between protection bubbles and blocks of the block distribution.

According to another feature of the invention, the method can further comprise constructing protection bubbles around modeled blocks of each block distribution, the radio communication systems in the protection bubbles not suffering mutual interference above respective tolerance thresholds, a second score being assigned to each block distribution as a function of a number of collisions between protection bubbles and blocks of the block distribution, and a block distribution being adopted that has first and second scores more than respective thresholds.

The invention adapts frequency band allocations dynamically to the requirements of the radio communication systems and in such a manner as to respect tolerance thresholds on interference between the radio communication systems.

According to another feature of the invention, each protection bubble can be constructed around a block relative to another block as a function of the spatial coordinates of the respective coverage areas associated with the two blocks and propagation characteristics of the radio communication systems associated with the two blocks.

Two radio communication systems associated with two respective blocks do not interfere with each other above respective tolerance thresholds when the protection bubble around one block is separate from the other block. Thanks to the protection bubbles around the modeled blocks, the invention allocates frequency bands optimally to the radio communication systems associated with the blocks to limit interference between the radio communication systems.

According to another feature of the invention, the method according to the invention can further comprise, if no block distribution has a score more than the predetermined threshold, selecting block distributions having the highest scores, replacing non-selected block distributions by selected distributions in such a manner as to preserve the same number of block distributions, and randomly selecting at least one block distribution and at least one block from the selected block distribution in order to modify the position of the selected block as a function of frequency. The method according to the invention can further comprise randomly selecting two block distributions and at least one radio communication system and interchanging of the blocks associated with each selected radio communication system between the two selected block distributions.

The steps of constructing the protection bubbles, assigning a score and selecting can be iterative. Following the iterations, the method according to the invention determines an optimum block distribution that in particular features minimum interference between the radio communication systems and a minimum total frequency band allocated to the radio communication systems.

The invention also relates to a device for allocating frequency bands to respective radio communication systems that comprises:

means for modeling allocation of a frequency band to each radio communication system by at least one three-dimensional block as a function of a frequency bandwidth and a coverage area of the radio communication system, means for determining at least one block distribution of the modeled blocks, means for assigning a first score to each block distribution as a function of a minimum frequency band including all the frequency bands of the blocks of the distribution, and means for adopting a block distribution having a first score more than a predetermined threshold in order to assign frequency bands to the radio communication systems in accordance with the distribution adopted.

The invention relates further to a storage medium or device readable by a data processing system, wherein the storage medium or device causes the system to perform the steps of the method of the invention.

The invention also relates to a computer arrangement for performing the steps of the method of the invention.

BRIEF DESCRIPTION OF THE DRAWINGS

Other features and advantages of the present invention will become more clearly apparent on reading the following description of embodiments of the invention given by way of nonlimiting example with reference to the corresponding appended drawings in which.

DESCRIPTION OF THE EMBODIMENTS

Figure 1:
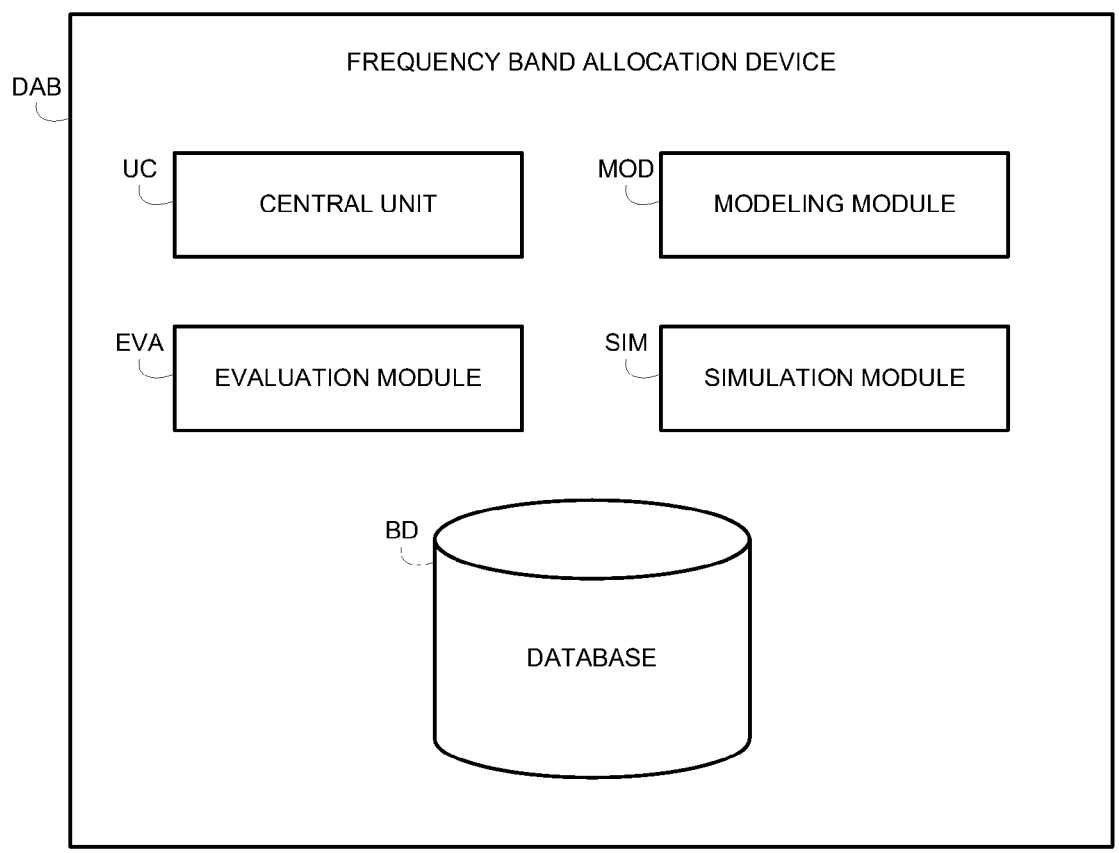
FIG. 1 is a schematic block diagram of a frequency band allocation device according to the invention.

Referring to FIG. 1, the frequency band allocation device DAB according to the invention comprises primarily a central unit UC, a modeling module MOD, an evaluation module EVA, a simulation module SIM and a database BD.

The frequency band allocation method according to the invention is implemented, for example, in the form of software implemented in the frequency band allocation device DAB, such as a personal computer or an application server. The device DAB contains the database BD including in particular data relating to radio communication systems, such as frequency bandwidths required for antennas of radio communication networks and associated with the identification of the antennas and with propagation characteristics and positions of the antennas and dimensional characteristics of coverage areas of the antennas.

In a variant, the database BD is in a database server connected to the device DAB locally or remotely via an Internet type telecommunication network.

The device DAB can communicate with entities of the fixed network of at least one UMTS (Universal Mobile Telecommunications System) type or GSM (Global System for Mobile Communications) type cellular radio communication network back to back with a GPRS (General Packet Radio Service) network. The entities can be an operation and maintenance center (OMC) and terrestrial interfaces between base station controllers known as radio network controllers (RNC) for a UMTS type network in order for the device DAB to transmit lists of allocations of frequency bands in accordance with the invention quickly to them.

The cellular radio communication network is a CDMA (Code Division Multiple Access) network, for example. I other examples, the cellular radio communication network is arranged with Wideband Code Division Multiple Access WCDMA or with High Speed Downlink Packet Access HSPDA.

The device DAB can also communicate with service entities of a wireless local area network of the WIFI (Wireless Fidelity) type, WIMAX (World wide Interoperability Microwave Access) type or WIBRO (Wireless Broadband) type, or a short-range network of the infrared or Bluetooth type.

As a general rule, the device DAB is connected to at least two service entities each managing a radio communication system offering a fixed service, for example, a mobile service or a radio broadcast service.

A radio communication system can be reduced to a base station in a radio communication network to which a frequency is to be allocated, or comprise a set of base stations belonging to the same radio communication network to which a frequency band is to be allocated. In the latter case, the operator of the radio communication network can allocate a frequency from the allocated frequency band to each base station of said set. According to another variant, a radio communication system can be a radio communication network to which a frequency band is to be allocated.

Figure 2:
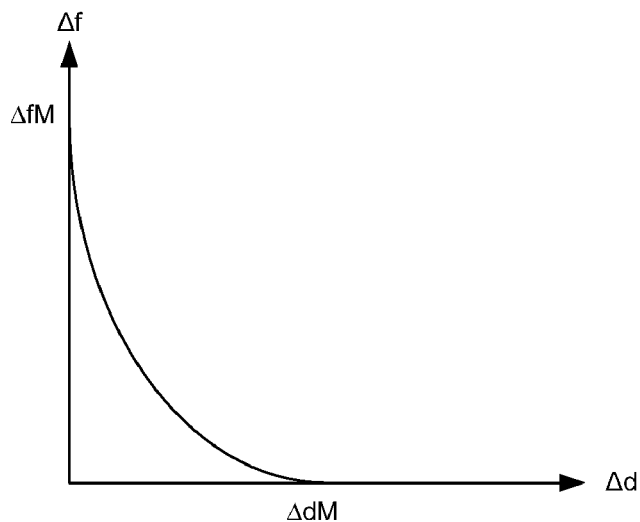
FIG. 2 is a graph showing the variation of a separation between two frequency bands used by two respective radio communication systems as a function of a distance between the coverage areas of the two radio communication systems.

FIG. 2 is a graph showing the variations of a guard band $\Delta f$ between respective frequency bands used by two radio communication systems as a function of the distance $\Delta d$ between the respective areas covered by the two radio communication systems. The distance $\Delta d$ and the guard band $\Delta f$ depend on the radio communication systems concerned and are respectively less than a predetermined maximum distance $\Delta dM$ and a predetermined maximum guard band $\Delta fM$.

The two radio communication systems do not interfere with each other if they use respective frequency bands that are sufficiently far apart as a function of the distance between the coverage areas of the radio communication systems. In particular, the two radio communication systems do not interfere with each other if they use respective frequency bands separated at least by the maximum guard band $\Delta fM$ or if the distance between the two coverage areas relating to the two radio communication systems is greater than the maximum distance $\Delta dM$.

As a general rule, each pair of radio communication systems is associated with a graph $\Delta f(\Delta d)$ that is different from the graphs associated with other pairs of radio communication systems and depends on the propagation characteristics of the radio communication systems constituting the pair.

Figure 3:
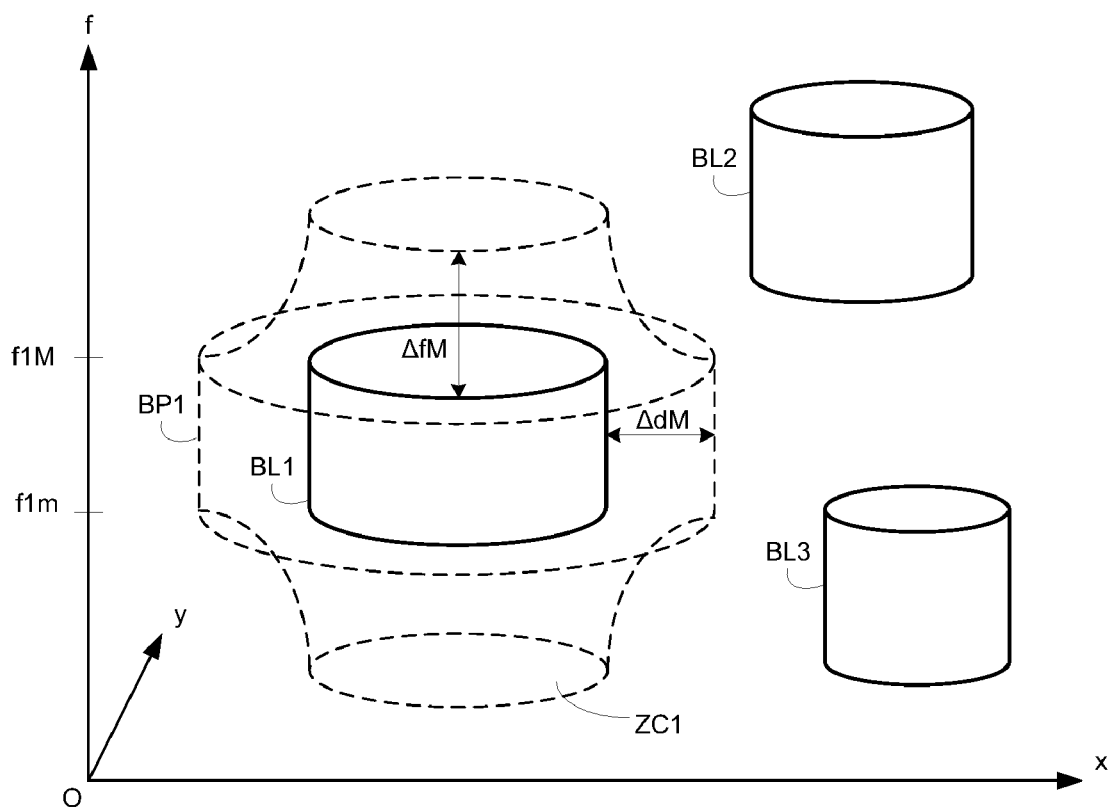
FIG. 3 is a diagram in a three-dimensional space showing modeling of allocation of frequency bands to radio communication systems by blocks delimited by coverage areas of the respective radio communication systems.

FIG. 3 represents modeling of frequency band allocation by three-dimensional blocks in a system of axes (Ox, Oy, Of). The dimensions and the contours of the coverage areas of the radio communication systems are defined using spatial coordinates x and y along two horizontal axes in a terrestrial coordinates plane. The third coordinate f along a vertical axis defines frequency bands to be allocated to the radio communication system. Allocation of a frequency band to a radio communication system is modeled by the modeling module MOD of the frequency band allocation device DAB.

The allocation of a frequency band to a radio communication system is represented in FIG. 3 by a block that is a three-dimensional object. In the example shown in FIG. 3, three three-dimensional blocks BL1, BL2 and BL3 are represented and associated with three respective different radio communication systems.

The orthogonal projection of a block associated with a radio communication system onto the terrestrial plane Ox, Oy corresponds to a coverage area ZC of the radio communication system. The orthogonal projection of the block onto the vertical axis f corresponds to a frequency band (fm, fM) to be allocated to the radio communication system.

For a given coverage area ZC1, plural frequency bands can be allocated to a radio communication system. In this case, a plurality of blocks associated with the same radio communication system is juxtaposed parallel to the axis Of.

The shape of the base of a block depends on the radio communication system associated with the block. For example, if the radio communication system comprises an omnidirectional antenna, the base has the shape of a disk. If the radio communication system comprises a directional antenna, the base has a circular sector shape.

The modeling module MOD determines a protection bubble BP1 around a block, which indicates the limit of frequency compatibility between the radio communication system associated with the block and another radio communication system.

The shape of a bubble for a first radio communication system is defined relative to a second radio communication system. The bubble delimits a region in which the first and second radio communication systems are adapted not to suffer interference from each other above respective tolerance thresholds.

The shape of the protection bubble BP1 is constructed by applying the curve shown in FIG. 2 to the block BL1. The block BL1 is enlarged laterally parallel to the terrestrial plane Ox, Oy by the maximum distance $\Delta dM$ for $\Delta f=0$ and vertically parallel to the frequency axis by the maximum guard band $\Delta fM$ for $\Delta d=0$. At the edges of the block BL1, the frequency band (f1$m$, f1M) is supplemented with the variation of the guard band $\pm \Delta f$ as a function of the variation of the distance $\pm \Delta d$ supplementing the two coordinates x and y in the coverage area ZC1 according to the curve shown in FIG. 2 in order to define completely the three-dimensional bubble BP1.

In FIG. 3, for example, if the protection bubble BP1 around the block BL1 is separate from the block BL2, then the two radio communication systems respectively associated with the blocks BL1 and BL2 can coexist.

If frequency band allocation modeling takes into account more than two radio communication systems, at least two protection bubbles are determined around a block. For example, if the three radio communication systems respectively associated with the three blocks BL1, BL2 and BL3 are considered for the frequency band allocation, then two protection bubbles are determined around the block BL1. A first protection bubble for protecting the block BL1 relative to the block BL2 is derived from a first graph $\Delta f(\Delta d)$ associated with a pair of radio communication systems having propagation characteristics similar to those represented by the blocks BL1 and BL2, respectively. A second protection bubble for protecting the block BL1 relative to the block BL3 is deduced from a second graph $\Delta f(\Delta d)$ associated with a pair of radio communication systems having propagation characteristics similar to those represented by the blocks BL1 and BL3, respectively. For example, a single protection bubble BP1 around the block BL1 for protecting it relative to one of the blocks BL2 and BL3 is represented in FIG. 3.

Figure 4:
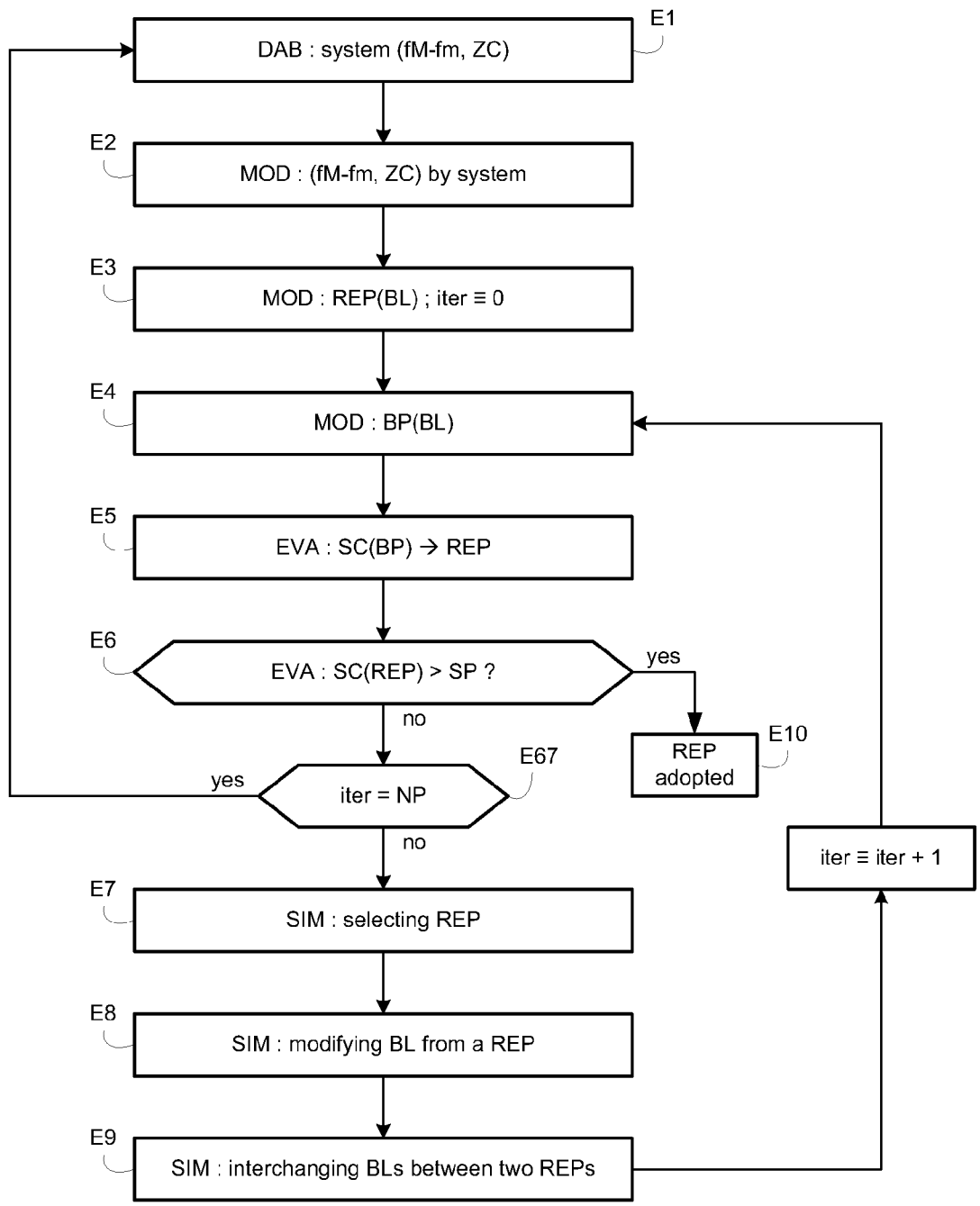
FIG. 4 is a flow chart of a method according to the invention of allocating frequency bands.

Referring to FIG. 4, the frequency band allocation method according to the invention comprises steps E1 to E10 executed under the control of the central unit UC in the frequency band allocation device DAB.

In the step E1, the frequency band allocation device DAB collects information relating to the maps of the coverage areas for each radio communication system whose operator wishes to benefit from frequency band allocation.

Furthermore, the device DAB is informed of the spectrum requirements of each radio communication system, i.e. a frequency bandwidth required by each radio communication system.

The information collected for each radio communication system comprises the spatial coordinates of the coverage area ZC of the radio communication system and the frequency bandwidth required by the radio communication system, and is stored in the database BD.

A plurality of radio communication systems can coexist at a given point of the terrestrial plane. In fact, a base station can include a plurality of antennas each requiring a frequency bandwidth in a different frequency band. For example, one antenna requires a frequency bandwidth in a frequency band specific to a UMTS type network and another antenna requires a frequency bandwidth in a frequency band specific to a WIMAX type network.

In the step E2, the modeling module MOD analyzes the information stored in the database BD and, for each radio communication system, models an allocation of a frequency band (fm, fM) to the radio communication system by a three-dimensional block BL as a function of the frequency bandwidth fM-fm required by the radio communication system and the dimensions and the position of the coverage area ZC of the radio communication system. The width of the frequency band to be allocated to a radio communication system is then at least equal to the frequency bandwidth required by the radio communication system.

In the step E3, the modeling module MOD determines one or more distributions REP of the modeled blocks BL as a function of variation of the limits fM and fm of the frequency bands to be allocated that depend on the frequency band widths fM-fm required by the radio communication systems associated with the blocks. Each distribution REP contains at least as many blocks as there are radio communication systems. For each radio communication system, the modeled block BL having a height equal to the frequency bandwidth fM-fm required by the radio communication system has positions in the system of axes (Ox, Oy, Of) that can vary only along the frequency axis Of and that are associated with the distributions REP, a position of the block possibly being associated with a plurality of distributions REP.

For example, for each block distribution REP, the blocks are placed randomly relative to each other along the frequency axis Of.

In one particular case, the distributions of the blocks are determined so that no block overlaps another block and all the frequency bands to be allocated to the radio communication systems associated with the blocks are contained in a predetermined total frequency band. In another example, one or more block distributions contain at least two blocks that are not separate. For example, the modeling module MOD determines a set of R=50 block distributions to be optimized during the subsequent steps.

The subsequent steps E4 to E9 are executed iteratively by the frequency band allocation device DAB to determine an optimum block distribution satisfying predetermined criteria depending on evaluated magnitudes.

On an initial iteration iter=0, the modeling module MOD constructs protection bubbles BP around blocks BL from among the modeled blocks for each block distribution REP in the step E4. Each protection bubble around a first block is constructed relative to a second block as a function of the graph Δf(Δd) associated with a pair of radio communication systems having propagation characteristics similar to the systems represented by the first and second blocks, respectively.

For example, the modeling module MOD determines as many protection bubbles around each block as there are modeled blocks except for the block in question. Thus a block is surrounded by a protection bubble relative to another block.

According to another example, for two of the radio communication systems concerned, a single protection bubble is determined around one of the two blocks. In this case, for N radio communication systems concerned, a number NB of bubbles to be determined around blocks of index i is given by the following relation:

$$NB=N(N-1)/2.$$

Alternatively, if two blocks are separated by a distance greater than a predetermined distance, no protection bubble is determined around one of the blocks.

In the step E5, the evaluation module EVA assigns at least one score SC to each block distribution REP.

For example, the score SC is assigned as a function of the width of the minimum frequency band including all the frequency bands of the blocks of the distribution. The score assigned to the distribution is then inversely proportional to the width of said frequency band.

Moreover, the score SC can also depend on the number of collisions between protection bubbles and blocks of the distribution. This score supplies an estimate of the quality of adaptation of the block distribution to the predetermined constraints. The score assigned to the distribution is inversely proportional to the number of collisions.

In another example, each distribution is assigned a first score as a function of the width of the minimum frequency band including all the frequency bands of the blocks of a distribution and a second score as a function of the number of collisions between protection bubbles and blocks of the distribution.

Additionally, the score or scores further depend(s) on the preferences of certain radio communication systems for using certain frequency bands and not using other frequency bands.

In the step E6, the evaluation module EVA compares the score SC assigned to each block distribution to a predetermined threshold SP.

If a block distribution REP has a score SC more than the predetermined threshold SP, the block distribution is adopted by the evaluation module EVA in order to allocate frequency bands to the radio communication systems in accordance with the distribution adopted, in a step E10. If several block distributions REP have a score more than the predetermined threshold, the block distribution adopted is that having the highest score, for example.

If no block distribution REP has a score SC more than the predetermined threshold SP, the process moves on to the step E7.

Alternatively, if plural scores have been assigned to each distribution in the step E5, the evaluation module EVA adopts the block distribution having all scores more than respective predetermined thresholds.

In the step E7, the simulation module SIM selects K block distributions to keep having the highest scores from among the R block distributions REP for the subsequent steps. For example, K is between R/2 and R. The distributions that are not selected are eliminated and are replaced by certain selected distributions that can be duplicated to preserve the same number R of distributions.

For example, a set of three block distributions contains first, second and third distributions assigned respective scores in decreasing order. The first and second distributions are selected and the third distribution is eliminated. The first distribution is then duplicated to obtain another set of three distributions. The duplication of at least the distribution assigned the highest score guarantees that this distribution will be retained for the next iteration.

In the step E8, the simulation module SIM selects at random at least one block distribution REP from among the R distributions obtained from the step E7 and at least one block BL of the selected distribution. Several blocks can be selected if they have the same spatial coordinates, for example. The simulation module SIM then modifies the position of the selected block(s) parallel to the frequency axis Of and thus as a function of frequency.

For example, one or several selected blocks are moved vertically, which amounts to allocating other frequency bands to the radio communication systems.

According to another example, at least one selected block is divided into sub-blocks, which amounts to allocating a plurality of separate frequency bands to a radio communication system instead of a single frequency band initially narrower than the set of frequency bands of the sub-blocks.

In the step E9, the simulation module SIM selects randomly two block distributions REP from among the R distributions resulting from steps E7 and E8, and selects at least one radio communication system.

The blocks associated with each radio communication system selected are interchanged between the two distributions selected by the simulation module SIM. The two distributions obtained in this way are referred to as crossed as each distribution comprises at least one block placed in accordance with the other initial distribution.

For example, two distributions are selected. The first distribution comprises three blocks "A1", "A2" and "A3" associated with radio communications "S1", "S2" and "S3", respectively. The second distribution comprises three blocks "B1", "B2" and "B3" associated with the radio communication systems "S1", "S2" and "S3", respectively. If the radio communication systems "S1" and "S2" are selected, the two distributions obtained after crossover comprise the three blocks "B1", "B2" and "A3" and the three blocks "A1", "A2" and "B3", respectively.

Where appropriate, a block distribution obtained after crossover can comprise blocks that overlap. In this case, this distribution featuring mutual interference between the radio communication systems represented by the blocks overlapping and therefore having a low score will not be selected in the step E7 of the next iteration and will therefore be eliminated.

Following the step E9, the process returns to the step E4 for the next iteration.

The steps E7 to E9 described hereinabove correspond to one particular implementation of a genetic algorithm that is itself a particular type of optimization algorithm.

Alternatively, the steps E7 to E9 can be replaced by steps of another optimization algorithm, for example of the "simulated annealing" type.

If the number iter of iterations reaches a predetermined number NP of iterations and no block distribution REP has a score SC more than or equal to the predetermined threshold SP in a step E67 between the steps E6 and E7, the frequency band allocation device DAB requests the operators of the radio communication systems to modify the spectrum requirements and/or the coverage areas of the radio communication systems.

In this case, the process can return to the step E1 in order to determine block distributions to be adopted.

In a variant, in the step E4, during iterations succeeding the initial iteration, only the protection bubbles around the blocks that have been modified in the steps E8 and E9 are determined again.

The invention described here relates to a method and a device for allocating frequency bands respectively to radio communication systems. In an embodiment, the steps of the method are determined by the instructions of a program incorporated in the frequency band allocating device of the invention. The computer program includes instructions which, when that program is executed in the device whose operation is then controlled by executing the program, perform the steps in the method of the invention.

Consequently, the invention applies equally to a computer program adapted to implement the invention, in particular a computer program stored on or in a storage medium readable by a computer or any data processing system. This program may be written in any programming language and take the form of source code, object code, or intermediate code between source code and object code, e.g. in a partially compiled form, or any other form suitable for implementing the method of the invention.

The storage medium may be any entity or device capable of storing the program. For example, the medium may comprise storage means on which the computer program of the invention is stored, such as a ROM, for example a CD-ROM or a microelectronic circuit ROM, or USB key, or magnetic storage means, for example a diskette (floppy disk) or hard disk.

Furthermore, the storage medium may be a transmissible medium such as an electrical or optical signal, which may be routed via an electrical or optical cable, by radio or by other means. The program of the invention may in particular be downloaded over an Internet type network.

Alternatively, the storage medium may be an integrated circuit into which the program is incorporated, the circuit being adapted to execute the method of the invention or to be used in the execution of the method of the invention.

What we claim is:

1. A method of allocating frequency bands to respective radio communication systems comprising:
    collecting from each radio communication system a frequency bandwidth and coordinates of a coverage area of the radio communication system,
    modeling allocation of a frequency band to each radio communication system by at least one three-dimensional block as a function of the collected frequency bandwidth and the collected coordinates of the coverage area of the radio communication system,
    determining at least one block distribution of the modeled blocks,
    assigning a first score to each block distribution as a function of a minimum frequency band including all the frequency bands of the blocks of said each block distribution, and
    adopting a block distribution having a first score more than a predetermined threshold in order to allocate and transmit frequency bands to said radio communication systems in accordance with the block distribution adopted.

2. A method according to claim 1, further comprising constructing protection bubbles around modeled blocks of each block distribution, said radio communication systems in said protection bubbles not suffering mutual interference above respective tolerance thresholds, and said first score being assigned to each block distribution also as a function of a number of collisions between protection bubbles and blocks of said each block distribution.

3. A method according to claim 1, further comprising constructing protection bubbles around modeled blocks of each block distribution, said radio communication systems in said protection bubbles not suffering mutual interference above respective tolerance thresholds, a second score being assigned to each block distribution as a function of a number of collisions between protection bubbles and blocks of said each block distribution, and the block distribution being adopted that has first and second scores more than respective thresholds.

4. The method according to claim 2, wherein each protection bubble is constructed around a block relative to another block as a function of spatial coordinates of the respective coverage areas associated with the two blocks and propagation characteristics of the radio communication systems associated with said two blocks.

5. A method according to claim 1, further comprising, if no block distribution has a score more than the predetermined threshold:
    selecting block distributions having the highest scores,
    replacing non-selected block distributions by selected distributions in such a manner as to preserve the same number of block distributions, and
    randomly selecting at least one block distribution and at least one block from the selected block distribution in order to modify the position of the selected block as a function of frequency.

6. A method according to claim 5, further comprising randomly selecting two block distributions and at least one radio communication system and interchanging of the blocks associated with each selected radio communication system between the two selected block distributions.

7. The method according to claim 5, wherein the steps of constructing the protection bubbles, assigning a score and selecting are iterative.

8. A device for allocating frequency bands to respective radio communication systems, said device comprising:
    means for collecting from each radio communication system a frequency bandwidth and coordinates of a coverage area of the radio communication system,
    means for modeling allocation of a frequency band to each radio communication system by at least one three-dimensional block as a function of the collected frequency bandwidth and the collected coordinates of the coverage area of the radio communication system,
    means for determining at least one block distribution of the modeled blocks,
    means for assigning a first score to each block distribution as a function of a minimum frequency band including all the frequency bands of the blocks of said each block distribution,
    means for adopting a block distribution having a first score more than a predetermined threshold, and
    means for allocating and transmitting frequency bands to said radio communication systems in accordance with the block distribution adopted.

9. A non-transitory computer-readable storage medium storing a computer program for allocating frequency bands to respective radio communication systems, said computer program of the computer-readable storage medium when executed by a computer cause the computer to execute the following steps:
    modeling allocation of a frequency band to each radio communication system by at least one three-dimensional block as a function of a frequency bandwidth and a coverage area of the radio communication system, determining at least one block distribution of the modeled blocks, assigning a first score to each block distribution as a function of a minimum frequency band including all the frequency bands of the blocks of said each block distribution, and adopting a block distribution having a first score more than a predetermined threshold in order to allocate frequency bands to said radio communication systems in accordance with the block distribution adopted.

* * * * *